(12) United States Patent  
Turgeman et al.

(10) Patent No.: US 11,928,583 B2  
(45) Date of Patent: Mar. 12, 2024

(54) ADAPTATION OF DEEP LEARNING MODELS TO RESOURCE CONSTRAINED EDGE DEVICES

(71) Applicant: International Business Machines Corporation, Armonk, NY (US)

(72) Inventors: Lior Turgeman, Moreshet (IL); Nir Naaman, Haifa (IL); Michael Masin, Haifa (IL); Nili Guy, Haifa (IL); Shmuel Kalner, D.N. Menashe (IL); Ira Rosen, Haifa (IL); Adar Amir, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 16/504,353

(22) Filed: Jul. 8, 2019

(65) Prior Publication Data

US 2021/0012187 A1    Jan. 14, 2021

(51) Int. Cl.
  *G06N 3/08*        (2023.01)
  *G06N 3/045*       (2023.01)

(52) U.S. Cl.
  CPC .............. *G06N 3/08* (2013.01); *G06N 3/045* (2023.01)

(58) Field of Classification Search
  CPC ...... G06N 3/08; G06N 3/0454; G06F 9/5072; G06K 9/6256
  See application file for complete search history.

(56) References Cited

U.S. PATENT DOCUMENTS

| | | | |
|---|---|---|---|
| 11,763,154 B1* | 9/2023 | Lupesko | G06N 20/20 706/12 |
| 2017/0270435 A1* | 9/2017 | Gallardo | G06N 20/00 |
| 2018/0089593 A1* | 3/2018 | Patel | G06F 30/00 |
| 2018/0253665 A1 | 9/2018 | Okanohara et al. | |
| 2018/0300124 A1 | 10/2018 | Malladi et al. | |
| 2019/0266015 A1* | 8/2019 | Chandra | G06F 9/505 |
| 2020/0202179 A1* | 6/2020 | Rajarathinam | G06N 3/084 |
| 2021/0123334 A1* | 4/2021 | Madasu | G06N 3/08 |

OTHER PUBLICATIONS

Shah, A., & Ghahramani, Z. (Jun. 2016). Pareto frontier learning with expensive correlated objectives. In International conference on machine learning (pp. 1919-1927). PMLR. (Year: 2016).*

(Continued)

*Primary Examiner* — Alan Chen
(74) *Attorney, Agent, or Firm* — Eyal Gilboa; Elliot J. Shine

(57) ABSTRACT

Techniques for generating a set of Deep Learning (DL) models are described. An example method includes training an initial set of DL models using the training data, wherein a topology of each of the DL models is determined based on the parameters vector. The method also includes generating a set of estimate performance functions for each of the DL models in the initial set based on the set of edge-related metrics, and generating a plurality of objective functions based on the set of estimated performance functions. The method also includes generating a final DL model set based on the objective functions, receiving a user selection of a selected DL model from the final DL model set, and deploying the selected DL model to an edge device.

19 Claims, 5 Drawing Sheets

(56) References Cited

OTHER PUBLICATIONS

Wang, S., Tuor, T., Salonidis, T., Leung, K. K., Makaya, C., He, T., & Chan, K. (Apr. 2018). When edge meets learning: Adaptive control for resource-constrained distributed machine learning. In IEEE Infocom 2018—IEEE conference on computer communications (pp. 63-71). IEEE. (Year: 2018).*

Breuel, T. M. (2015). Benchmarking of LSTM networks. arXiv preprint arXiv:1508.02774. (Year: 2015).*

Mammadli et al., The Art of Getting Deep Neural Networks in Shape, ACM Transactions on Architecture and Code Optimization, vol. 15, No. 4, Article 62. Publication date: Jan. 2019; pp. 62:1-62:21 (Year: 2019).*

Elsken et al., Efficient Multi-Objective Neural Architecture Search via Lamarckian Evolution, arXiv:1804.09081v4 [stat.ML] Feb. 26, 2019; pp. 1-23 (Year: 2019).*

Ghamizi et al., Automated Search for Configurations of Deep Neural Network Architectures, arXiv:1904.04612v1 [cs.LG] Apr. 9, 2019; pp. 1-18 (Year: 2019).*

Thornton, Chris et al., "Auto-WEKA: Combined Selection and Hyperparameter Optimization of Classification Algorithms," In Proc. of ACM SIGKDD conference on Knowledge Discovery and Data Mining (KDD). 847-855., arXiv:1208.3719v2 [cs.LG], Mar. 6, 2013, pp. 9.

Han, Song et al., "Learning both Weights and Connections for Efficient Neural Networks," In NIPS '15. 2015, pp. 9.

Han, Song et al., "EIE: Efficient Inference Engine on Compressed Deep Neural Network," In ISCA '16. arXiv:1602.01528v2 [cs.CV], May 3, 2016, pp. 12.

Howard, Andrew G. et al., "Mobilenets: Efficient Convolutional Neural Networks for Mobile Vision Applications," arXiv:1704.04861v1 [cs.CV], Apr. 17, 2017, pp. 9.

Georgiev, Petko et al. "Low-resource Multi-task Audio Sensing for Mobile and Embedded Devices via Shared Deep Neural Network Representations," ACM Interact. Mob. Wearable Ubiquitous Technol. 9, 4, Article 39 (Mar. 2010), revised May 2017; accepted Jun. 2017, pp. 19.

Gupta, Chirag et al., "ProtoNN: Compressed and Accurate kNN for Resource-scarce Devices," International Conference on Machine Learning. 2017, pp. 16.

Kang, Yiping et al. "Neurosurgeon: Collaborative Intelligence Between the Cloud and Mobile Edge," In ASPLOS '17, 2017, pp. 15.

Teerapittayanon, Surat et al. "Distributed Deep Neural Networks over the Cloud, the Edge and End Devices," In ICDCS '17, 2017, pp. 12.

Lai, Lingzhen et al., "Rethinking Machine Learning Development and Deployment for Edge Devices," arXiv:1806.07846v1 [cs.LG], Jun. 20, 2018, pp. 20, https://arxiv.org.

Wang, Shiqiang et al., "Adaptive Federated Learning in Resource Constrained Edge Computing Systems," arXiv:1804.05271v2 [cs.DC], Aug. 2, 2018, pp. 10, https://arxiv.org.

* cited by examiner

ADAPTATION OF DEEP LEARNING MODELS TO RESOURCE CONSTRAINED EDGE DEVICES

BACKGROUND

The present disclosure relates to techniques for generating Deep Learning models. More specifically, present disclosure describes techniques for generating Deep Learning (DL) models for deployment to resource-constrained edge devices.

SUMMARY

According to an embodiment described herein, a system for generating a set of Deep Learning (DL) models includes a storage device to store a training corpus comprising training data, a parameters vector, and a set of edge-related metrics. The system also includes a processor to train an initial set of DL models using the training data, wherein a topology of each of the DL models is determined based on the parameters vector. The processor also generates a set of estimated performance functions for each of the DL models in the initial set based on the set of edge-related metrics, generates a plurality of objective functions based on the set of estimated performance functions, and generates a final DL model set based on the objective functions. The processor is also configured to receive a user selection of a selected DL model from the final DL model set, and deploy the selected DL model to an edge device.

In some embodiments, a method of generating a set of Deep Learning (DL) models includes training an initial set of Deep Learning (DL) models on training data, wherein a topology of each of the DL models is determined based on a parameters vector. The method also includes generating a set of estimate performance functions for each of the DL models in the initial set based on a set of edge-related metrics, generating a plurality of objective functions based on the set of estimated performance functions, and generating a final DL model set based on the objective functions. The method also includes receiving a user selection of a selected DL model from the final DL model set, and deploying the selected DL model to an edge device.

In yet another embodiment, a computer program product for generating a set of Deep Learning (DL) models includes a computer readable storage medium having program instructions embodied therewith, wherein the computer readable storage medium is not a transitory signal per se, and wherein the program instructions are executable by a processor. The program instructions cause the processor to train an initial set of DL models using training data, wherein a topology of each of the DL models is determined based on a parameters vector that specifies a number of layers and a number of nodes per layer for each model in the initial set of DL models. The program instructions also cause the processor generate a set of estimated performance functions for each of the DL models in the initial set based on a set of edge-related metrics comprising an inference time, a model size, and a test accuracy, generate a plurality of objective functions based on the set of estimated performance functions, and generate a final DL model set based on the objective functions. The program instructions cause the processor receive a user selection of a selected DL model from the final DL model set, and deploy the selected DL model to an edge device.

DETAILED DESCRIPTION

Figure 1:
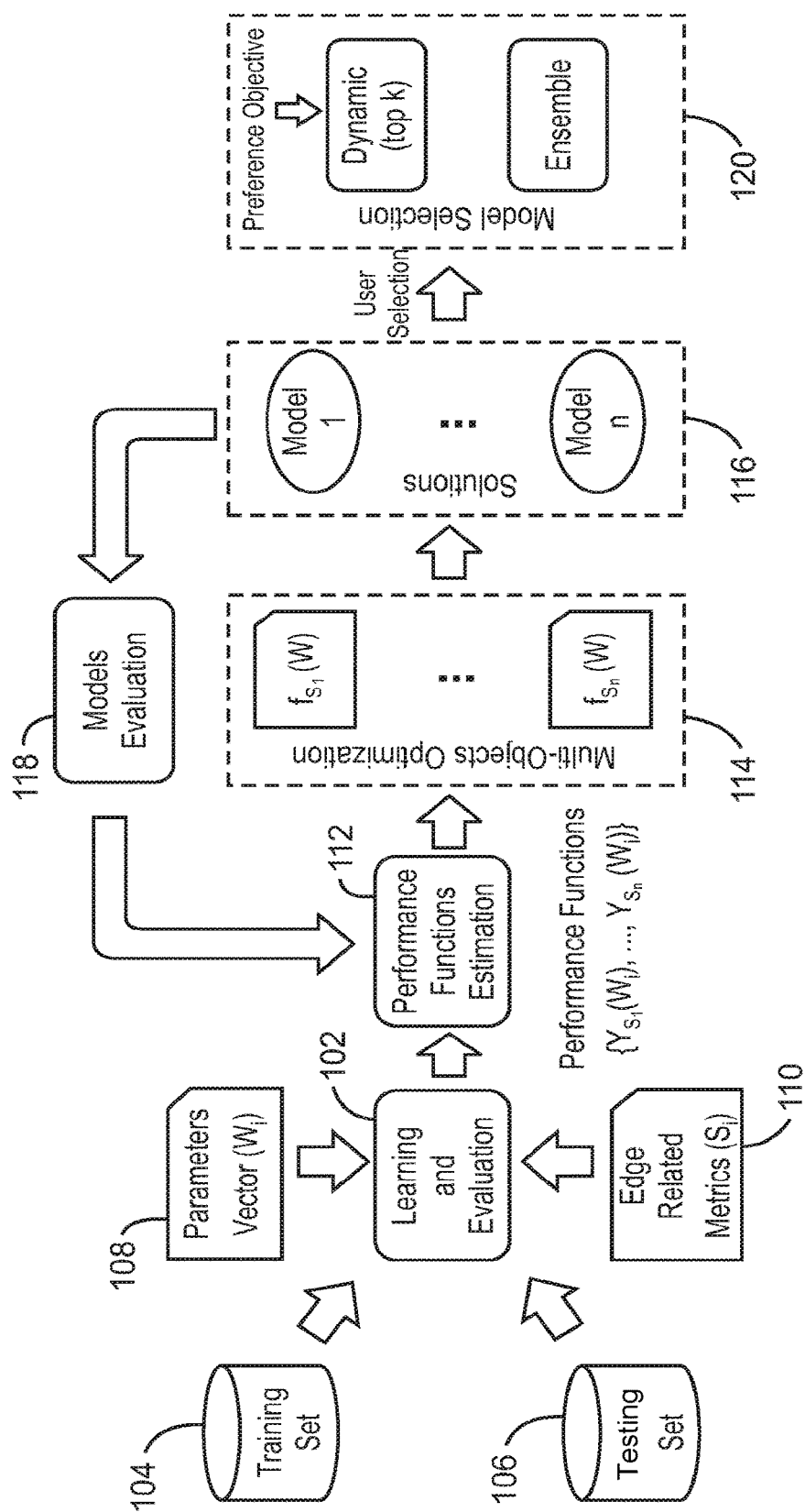
FIG. 1 is a process flow diagram showing an example method of generating a set of DL models for deployment on resource-constrained edge devices according to an embodiment described herein.

As a result of the rapid advances of Internet of Things (IoT) and intelligent edge devices, there is an increasing demand for implementing Deep Learning (DL) algorithms on resource-constrained edge devices that have limited memory and computation power. The enormous demand for memory storage and computation power hinders the deployment of Deep Learning models on such resource-constrained devices. Conventional Deep Learning approaches focus on a single objective setting, where the learning algorithm optimizes over a single performance criterion (e.g. loss function) or a heuristic function. The basic assumption of those approaches is that the optimization over one single objective can improve the overall performance of the model classification and meet the requirements of various applications.

A common approach for accelerating DL models on resource constrained devices is to compress the model, to reduce its resource and computational requirements. However, this approach may result in a loss of precision. Other approaches involve offloading some, or all, computation to a cloud server. However, this is not always possible due to privacy constraints, such as when sending sensitive data over the network is prohibitive, as well as latency, where a fast and reliable network connection is not always guaranteed. Furthermore, both approaches do not consider the different trade-offs among different resource related objectives, are limited to Neural-Nets architectures, and typically ignore some basic hyper-parameter optimization issues due to being focused on replicating the original model's performance regardless of what are the most important hyper-parameters to capture the relevant data patterns associated with the prediction outcome, and what could be good values for the hyper-parameters. For instance, compression related methods are focused on finding the smallest possible neural net that can most accurately represent the thing it is supposed to learn, whereas approaches which involve offloading computation to a cloud server aim to adapt a partition point of a deep model for best latency and energy consumption. Furthermore, those approaches do not adapt model structure to the characteristics of a given edge, but rather attempt to manipulate the model structure structure, at minimal cost of either accuracy or latency, by finding a single solution as a global optimization problem.

The present disclosure describes techniques for generating DL models with the best topology of a DL model structure, which yields the best performance on a given edge with regards to its resource constraints. The techniques described herein improve learning performance by provide a more efficient utilization of the limited computation and resources at the edge. This enables the deployment of DL models such as Deep Neural Nets (DNN) on resource-constrained edge devices with limited memory and computation power, while balancing the trade-offs among multiple inconsistent objectives, such, reducing the model size while improving accuracy.

In accordance with the present techniques, model performance metrics of interest (Si) are evaluated for the given training and testing sets, with respect to different values of the DL model's parameters. Those metrics of interest refer to different resource constraints of edge devices, such as DL model size, inference time, accuracy, and others. The DL model's performance is optimized over multiple objectives which refer to the metrics of interest (multi-objective optimization), thereby adapting the model to a given edge. In the multi-objective optimization process, each objective corresponds to an optimal solution. Since the optimization objectives may be inconsistent, even conflicting, one cannot identify a single solution that is optimal on all objectives. Therefore, the different trade-offs are incorporated among the multiple objectives. This results in a set of non-dominated DL model solutions, each of which are optimal according to different trade-offs among multiple objectives. Users can then flexibly construct various predictive models from the solution set for a given edge, considering its resource constraints.

The techniques described herein enable the development of DL models that provide a good compromise among various different trade-offs that are suitable for a given edge by incorporating prior knowledge about model properties that are well-suited for a given classification task given specific edge constraints. Reducing the size of the search space and simplifying the search is done by performing a set of experiments to find well-performing model architectures quickly, while convergence to a region of optimal model architectures is achieved by applying multi-objective optimization to a set of estimated performance functions for the DL models.

FIG. 1 is a process flow diagram showing an example method of generating a set of DL models for deployment on resource-constrained edge devices. The process may be performed any suitable computing system, such as a server, desktop computer, cloud computing node, and the like. The process may begin at block 102.

At block 102, a set of DL models are trained and evaluated. The DL models are trained using training data set 104 and testing data set 106. The topology of each of the DL models is determined by a parameters vector 108 which determines features of each of the DL models such as number of layers, number of nodes per layer, and others. Each of the DL models is also associated with a set of edge related metrics 110. The edge related metrics 110 are used to estimate the performance functions. For example, the performance functions can be estimated by running a set of experiments on a given DL model, to estimate the edge related metrics behavior as function of the model parameters.

The training data set 104 includes a vector, x, which is regarded as the input of the DL model, and a scalar, y, that is the desired output of the model. To facilitate the learning, each model has a loss function defined on its parameter vector, w, for each dataset. The loss function captures the error of the model on the training data, and the model learning process is to minimize the loss function on a collection of training data samples. In embodiments of the present techniques, the model structure is adapted to a given edge device by considering the tradeoffs among multiple inconsistent objectives, which are inherently related to the resource-constrains of that edge, while minimizing the loss function of the trained model. For a given set of edge related metrics, $S_i$, the following vectorial function is optimized:

$$F(w) = (f_{s_1}(w), f_{s_2}(w), \ldots, f_{s_m}(w))^T$$

Where $f_{s_j}(w)$ are objective functions which refer to different resource constraints related performance functions, which are estimated during the training of the model. W is a decision vector containing n parameter variables, which could be represented by:

$$w = (w_1, w_2, \ldots, w_n)$$

In general, multiple objectives are contradicting. Accordingly, a Pareto front of all possible trade-offs may be computed to identify the optimal DL models taking into consideration all of the multiple objectives. The formulation of the problem covers two spaces: the n-dimensional decision space, denoted as 106, in which decision variables coexist and where each coordinate axis corresponds to a different model parameter; and the m-dimensional objective space, denoted as Λ, in which objective functions coexist and where each coordinate axis corresponds to a different resource constraint related performance functions, e.g., different components of vector F(w). For instance, for m=4, our problem can be formulated as follows:

$$\text{minimize}\{f_{loss}(w)\}$$

$$\text{minimize}\{f_{test\_inf}(w)\}$$

$$\text{minimize}\{f_{model\_size}(w)\}$$

$$\text{minimize}\{f_{test\_acc}(w)\}$$

subject to $\{w \in \Omega : w_1 < w < w_2\}$. Where $f_{loss}(w)$ is the loss function, $f_{test\_inf}(w)$ is the testing set inference time, $f_{model\_size}(w)$ is the model size, and $f_{test\_acc}(w)$ is the accuracy for the testing set, for the given set of parameters values, w. The learning problem is then to find minimize F(w) were w is the parameter vector (i.e., $w^* = \arg\min F(w)$). Since the objectives may contradict each other, no single set of values achieves optimal values of all objectives simultaneously. After solving this multi-objective optimization problem, the best tradeoffs among the objectives can be defined in terms of Pareto optimality. A good solution of a multi-objective optimization problem, which maintain diversity, is expected to converge to the Pareto front. User preferences could be taken into account either as constraints to the multi-optimization problem, or as an additional objective function, at the stage of model selection.

The first step of the process is performed at learning and evaluation block 102. Input to the block includes the training set, $D_s$, the testing set, $D_t$, the parameters vector, $w_i$, and the edge related metrics, $S_m$. The training of the DL model is an iterative process by which the weights of the DL model will be adjusted after each iteration to minimize the loss function. The testing set is the set of data that is used to perform a validation of the DL model after training has finished. The parameters vector describes parameters of each of the n DL models. For example, a parameters vector may indicate the number of layers and number of nodes of each of the layers of each DL model. At the learning and evaluation block 102 a set of n DL models will be trained, wherein each DL model differs in terms of the parameter vectors defined for that DL model. Additionally, each model may be evaluated in terms of the edge related metrics for each parameter value, for example, inference time versus different values of kernel size, or model size versus different values of number of layers.

Next at block 112, a set of m estimated performance functions are computed for each of the trained DL models. Each performance function is a set of values that are computed for each of the edge related metrics, s, (e.g., inference time, model size, etc.). For example, three DL models may be trained, one using two layers, one using four layers, and one using six layers. The estimated performance functions describe how the performance of these DL models change throughout the range of parameters in terms of the edge related metrics of interest. The estimate performance functions may therefore be used to identify the best DL model parameters to use for a given objective, such as minimizing inference time, minimizing model size. Example pseudo code for the process performed by the learning and evaluation block is shown below.

```
Input:
    D_t : training data set
    D_s : testing data set
    w_n: parameters vector
    n' : number of sampling points
    S_m : edge related metrics
Output:
    Ψ: model set
    y_w: performance functions
Procedure:
    For i = 1: n do
        Train Ψ|(D_t, w_i){w_ik ∈ W_k}
        For j = 1: m do
            Compute y_sj(w_i) ← ψ(D_t, D_s, w_i)
        End for
        Return y
    End for
    Return Ψ
End Procedure
```

At block 114, the performance function estimations computed at block 112 are used to perform multi-objective optimization. At block 114, the estimated performance functions are processed to identify the optimal DL models. To identify the DL models, the performance functions estimations are processed to identify optimal model parameters, subject to the set of constraints used to train the DL models. For each edge related metric, a set of objective functions are computed based on the estimated performance functions computed for the DL models, and the objective functions are processed to identify the optimal DL models. For example, a Pareto front may be computed based on a plot of the DL model parameters versus DL performance as computed by the objective functions, and the optimal DL models may be identified by identifying a maxim or minim value of the objective functions on the Pareto front. Example pseudo code for the process performed by the learning and evaluation block is shown below.

```
Input:
    f(w): Objective Functions (f(w) = {y(w)}_s)
    (w_ik ∈ W̃_k ⊂ W_k): set of constraints
    Ψ: Model Set
Output:
    Ψ(P)
```

-continued

```
Procedure:
    Optimize (f_s1(w), f_s2(w), ... f_sm(w))^T subject to(w_ik ∈ W̃_k)
    Select Pareto-optimal model set Ψ(P*) by considering Cardinality
    Metrics (C), Accuracy Metrics (A) and Diversity Metrics (D)
    Return Ψ(P)
```

In the above procedure, the cardinality metrics refer to the number of MOP solutions that exist, the accuracy metrics refer to the convergence of the solutions, which could be estimated by the distance of the solutions from the theoretical Pareto optimal front, and the diversity metrics refer to the distribution and spread of the solutions, while the spread refers to the range of values covered by the solutions. The Multi-Objective optimization (MOP) performed at block 114 results in a set of optimized DL models 116. The optimized models are non-dominated solutions which are optimal according to different trade-offs among multiple objectives. The DL models may be stored for further evaluation and eventual selection for use in an edge device.

At block 118, the DL models identified at block 114 are evaluated to determine the performance of the resulting DL models with respect to the expected performance functions. For example, analysis of the objective functions performed at block 114 may indicate that a model with three layers provides the lowest inference time. However, this may be based on performance functions that were sampled at two layers and four layers. Therefore, the performance of the three-layer DL model may be verified to ensure that the actual performance of the resulted DL model is close to the estimated performance. If the actual performance differs from the estimated performance by a specified threshold, the performance function is corrected and MOP runs again, thus yielding a more accurate estimation of the parameters of the DL models.

To evaluate the DL models, each DL model is trained using the new DL model parameters. For each new DL model, a new estimated performance function is computed for each edge related metric. The new estimated performance functions are then compared to the corresponding objective functions that were computed for the DL model at block 114. If the difference between the new estimated performance functions and the resulting DL model performance function exceeds a threshold (referred to herein as the edge-related error criteria), then the performance function is modified and MOP runs again. Therefore, a new set of DL models are generated, which replaces the previously set of resulted DL models. The parameters of the new resulted DL model are then more optimal according to different trade-offs among multiple MOP objectives. Then the process performed at block 114 may be repeated. Any new updated DL model may be stored and take the place of the previous version of the DL model. Example pseudo code for the process performed by the learning and evaluation block is shown below.

```
Input:
    D_t : training data set
    D_s : testing data set
    Ψ (P): Model Set
    w_n: parameters vector
    N : number of models
    l : labels
    S_m : edge related metrics
    ζ_m : edge related error criteria
Output:
```

-continued

```
Ψ̃(P) : final model set
ỹ(w) : final performance functions
Procedure:
    For i = 1: n do
        Train Ψ_n, (P, D_t, w_i){n' ∈ ℝ: 1 ≤ n' ≤ N, w_ik ∈ W_k}
        For j = 1: m do
            Compute y_{s_j}(w_i) ← ψ_n'(P, D_t, D_s, w_i)
            if |y_{s_j}(w_i) − f_{s_j}(w_i)| > ζ_ji
                Ψ_n' ∈ Ψ̃(P)
            End If
        End For
    End For
    If Ψ(P) ≠ ∅
        ỹ(w) = Performance functions estimation (y(w))
        repeat multi-objective optimization for {ỹ(w)}
    Else
        Model selection {Ψ(P)}
    End if
```

At block 120, a user may select one of more DL models from the resulting DL model solution set 116 to be deployed in computing devices, including resource constrained edge devices. The performance functions computed for the DL models may also be stored in association with each of the DL models so that the user is able to identify which DL models satisfy the needs of the user. The user is then able to select a model according to some objective criteria preferred by the user, such as the size, accuracy, or the inference time of the DL model. In some embodiments, the user may select a single DL model based on the preferred objective. In some embodiments, the user may specify an objective criteria and the DL models may be ranked according to the specified objective criteria to facilitate identification of the suitable DL models to be deployed.

The edge device may be any suitable computing device and the DL model may be used in any suitable Machine-Learning application. The DL model may be used, for example, as a classifier that monitors input received from a microphone or image capture device to identify the presence of a certain feature in the audio or video signal image. The edge device may also be a smart phone configured for face recognition and the DL model used as a classifier that receives images from the smart phones camera to identify whether the image includes a face, including a face of a recognized user. As another example, the edge device may be an Internet of Things (IoT) device, such as an IoT device used to monitor characteristics of electrical equipment, and the DL model may be used a classifier for identifying failure modes of the electrical equipment. The edge device may also be a monitoring station used in a production facility and the DL model may be used as a classifier for identifying mechanical defects in a manufactured product. The examples provided above are not intended to be exhaustive as several other implementations are also possible.

In some embodiments, an ensemble of the DL models to be deployed on the edge device, with the final prediction to be based on a voting scheme. For example, the may select all of the DL models for deployment or the user may select a number of the top ranked models that have been ranked according to a specified objective criteria. If an ensemble of DL models is deployed, each of the DL models may make predictions based on the same DL model input, and a final prediction may be determined according to a voting scheme, such as a majority vote or others. This approach to model selection provides user flexibly in selecting the preferred objective for a user's applications and can also improve the generalization performances with ensemble learning.

Figure 2:
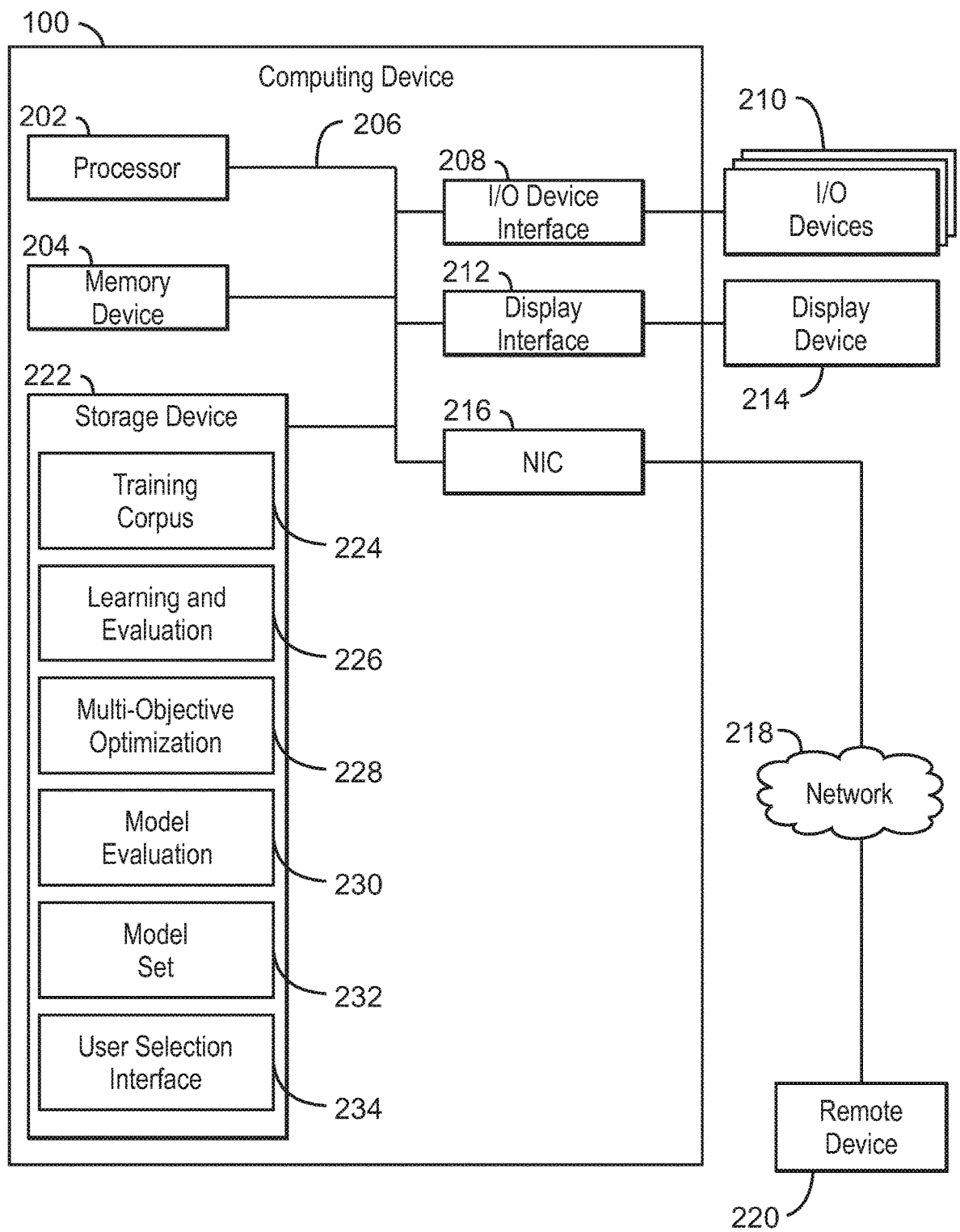
FIG. 2 is a block diagram of an example computing device configured to generate a set of DL models optimized for deployment on resource-constrained edge devices according to an embodiment described herein.

FIG. 2 is a block diagram of an example computing device configured to generate a set of DL models optimized for deployment on one or more resource-constrained edge devices. The computing device 200 may be for example, a server, desktop computer, laptop computer, tablet computer, or smartphone. In some examples, computing device 200 may be a cloud computing node. Computing device 200 may be described in the general context of computer system executable instructions, such as program modules, being executed by a computer system. Generally, program modules may include routines, programs, objects, components, logic, data structures, and so on that perform particular tasks or implement particular abstract data types. Computing device 200 may be practiced in distributed cloud computing environments where tasks are performed by remote processing devices that are linked through a communications network. In a distributed cloud computing environment, program modules may be located in both local and remote computer system storage media including memory storage devices.

The computing device 200 may include a processor 202 that is adapted to execute stored instructions, a memory device 204 to provide temporary memory space for operations of said instructions during operation. The processor can be a single-core processor, multi-core processor, computing cluster, or any number of other configurations. The memory 204 can include random access memory (RAM), read only memory, flash memory, or any other suitable memory systems.

The processor 202 may be connected through a system interconnect 206 (e.g., PCI®, PCI-Express®, etc.) to an input/output (I/O) device interface 208 adapted to connect the computing device 200 to one or more I/O devices 210. The I/O devices 210 may include, for example, a keyboard and a pointing device, wherein the pointing device may include a touchpad or a touchscreen, among others. The I/O devices 210 may be built-in components of the computing device 200, or may be devices that are externally connected to the computing device 200.

The processor 202 may also be linked through the system interconnect 206 to a display interface 212 adapted to connect the computing device 200 to a display device 214. The display device 214 may include a display screen that is a built-in component of the computing device 200. The display device 214 may also include a computer monitor, television, or projector, among others, that is externally connected to the computing device 200. In addition, a network interface controller (NIC) 216 may be adapted to connect the computing device 200 through the system interconnect 206 to the network 218. In some embodiments, the NIC 216 can transmit data using any suitable interface or protocol, such as the internet small computer system interface, among others. The network 218 may be a cellular network, a radio network, a wide area network (WAN), a local area network (LAN), or the Internet, among others. A remote device 220 may connect to the computing device 200 through the network 218.

In some examples, the processor 202 can be linked through the system interconnect 206 to the storage device 222, which can include a training corpus 224, learning and evaluation module 226, multi-objective optimization module 228, model evaluation module 230, model set 232, and user selection interface 234. The training corpus 224 includes the training data set 104, testing data set 106, parameters vector 108, and edge related metrics 110 described in relation to FIG. 1. The learning and evaluation module 226 generates an initial set of DL models and corresponding the estimated performance functions 112 as described above in relation to block 102 of FIG. 1. The multi-objective optimization module 228 generates a set of objective functions based on the performance functions and evaluates the objective functions to generate an DL model set 232 as described above in relation to block 114 of FIG. 1. The model evaluation module 230 evaluates the DL model set 232 to verify the performance of the DL models and refines the DL models if the actual performance varies from the expected performance as described above in relation to block 118 of FIG. 1. The user selection interface 234 enables the users to select one or more DL models for deployment on an edge device in accordance with the techniques described in relation to FIG. 1. In some embodiments, the edge device may be communicatively coupled to the computing device as a remote device 220.

It is to be understood that the block diagram of FIG. 2 is not intended to indicate that the computing device 200 is to include all of the components shown in FIG. 2. Rather, the computing device 200 can include fewer or additional components not illustrated in FIG. 2 (e.g., additional memory components, embedded controllers, modules, additional network interfaces, etc.). Furthermore, any of the functionalities of the learning and evaluation module 226, multi-objective optimization module 228, model evaluation module 230, and user selection interface 234 are partially, or entirely, implemented in hardware and/or in the processor 202. For example, the functionality may be implemented with an application specific integrated circuit, logic implemented in an embedded controller, or in logic implemented in the processor 202, among others. In some embodiments, the functionalities are implemented with logic, wherein the logic, as referred to herein, can include any suitable hardware (e.g., a processor, among others), software (e.g., an application, among others), firmware, or any suitable combination of hardware, software, and firmware.

Figure 3:
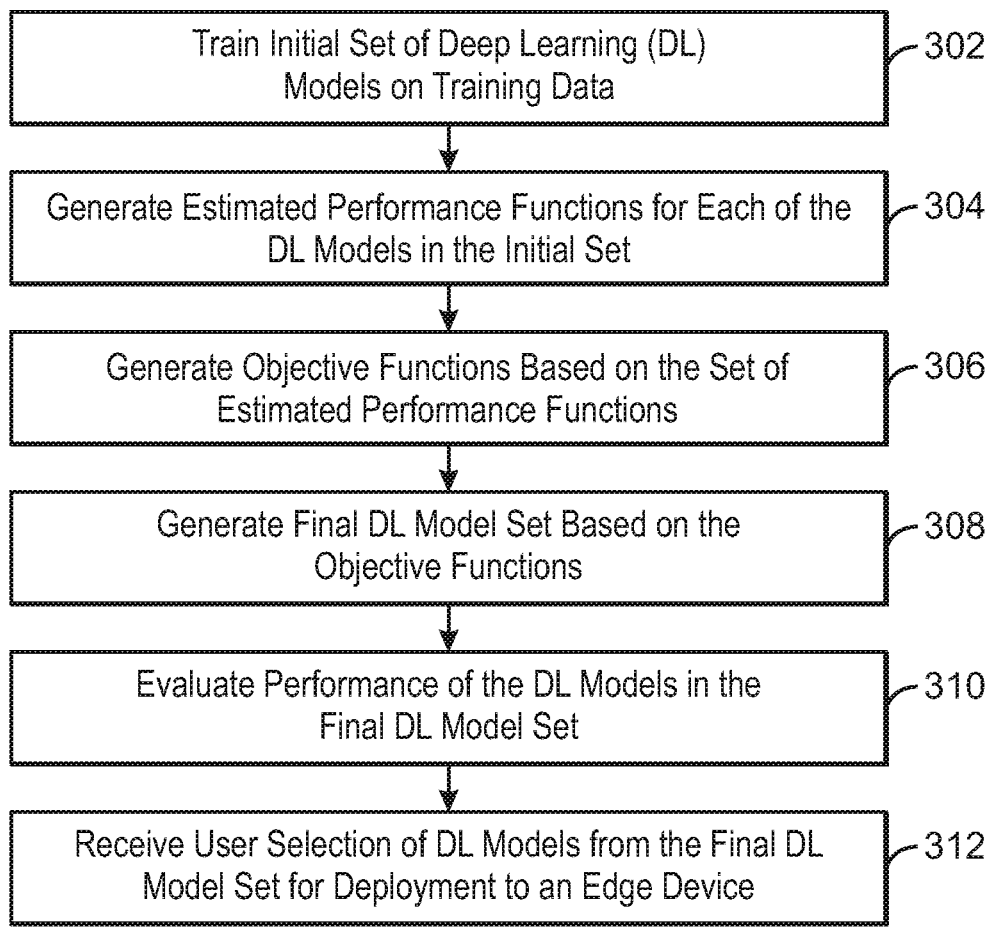
FIG. 3 is a process flow diagram of an example method of generating a set of DL models for deployment on resource-constrained edge devices according to an embodiment described herein.

FIG. 3 is a process flow diagram of an example method of generating a set of DL models. The method 300 can be implemented with any suitable computing device, such as the computing device 300 of FIG. 3.

At block 302, an initial set of Deep Learning (DL) models is trained using a set of on training data. The topology of each of the DL models is determined based on a parameters vector, which specifies attributes of the DL model such as the number of layers and the number of nodes per layer for each model in the initial set of DL models.

At block 304, a set of estimated performance functions are computed for each of the DL models in the initial set. The estimated performance functions are computed based on a set of edge-related metrics such as an inference time, a model size, and a test accuracy. The estimated performance functions provide sampled performance values for computing a plurality of objective functions.

At block 306, plurality of objective functions are computed based on the set of estimated performance functions. The estimated performance functions provide sampled performance values for computing the plurality of objective functions. The objective functions describe how the performance characteristics of the DL models change due to changes in each DL model topology, e.g., number of layers, number of nodes per layer, etc.

At block 308, a final DL model set is generated based on the objective functions. The final set of DL models may be determined by identifying the model parameters that result in a specified objective, such as minimizing inference time, maximizing accuracy, and the like. In some embodiments, generating the final DL model set comprises to computing a Pareto front corresponding to a plot of DL model parameters versus DL model performance as computed by the objective functions.

At block 310, performance of the DL models in the final DL model set are evaluated to determine whether a performance predicted by the objective functions is in agreement with an actual performance of the DL models. If the performance of one of the DL models, as predicted by the corresponding objective function, differs from the actual performance of the DL model by a threshold error criterion, the DL model may be replaced with a new DL model by adjusting a topology of the DL model and re-training the DL model.

At block 312, a user may select one or more of the DL models from the final DL model set for deployment to an edge device. For example, a user interface may enable a user to specify an objective and generate a ranked list of top ranked DL models, which are ranked in accordance with the specified objective. The top ranked models may be displayed to the user, allowing the user to select the one or more of the DL models for deployment. If a plurality of DL models are deployed to the edge device, each DL models make predictions based on a common DL model input, with a final prediction to be determined based on a voting scheme.

The process flow diagram of FIG. 3 is not intended to indicate that the operations of the method 300 are to be executed in any particular order, or that all of the operations of the method 300 are to be included in every case. Additionally, the method 300 can include additional operations. Addition variations on the above method 300 may be made within the scope of the described subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
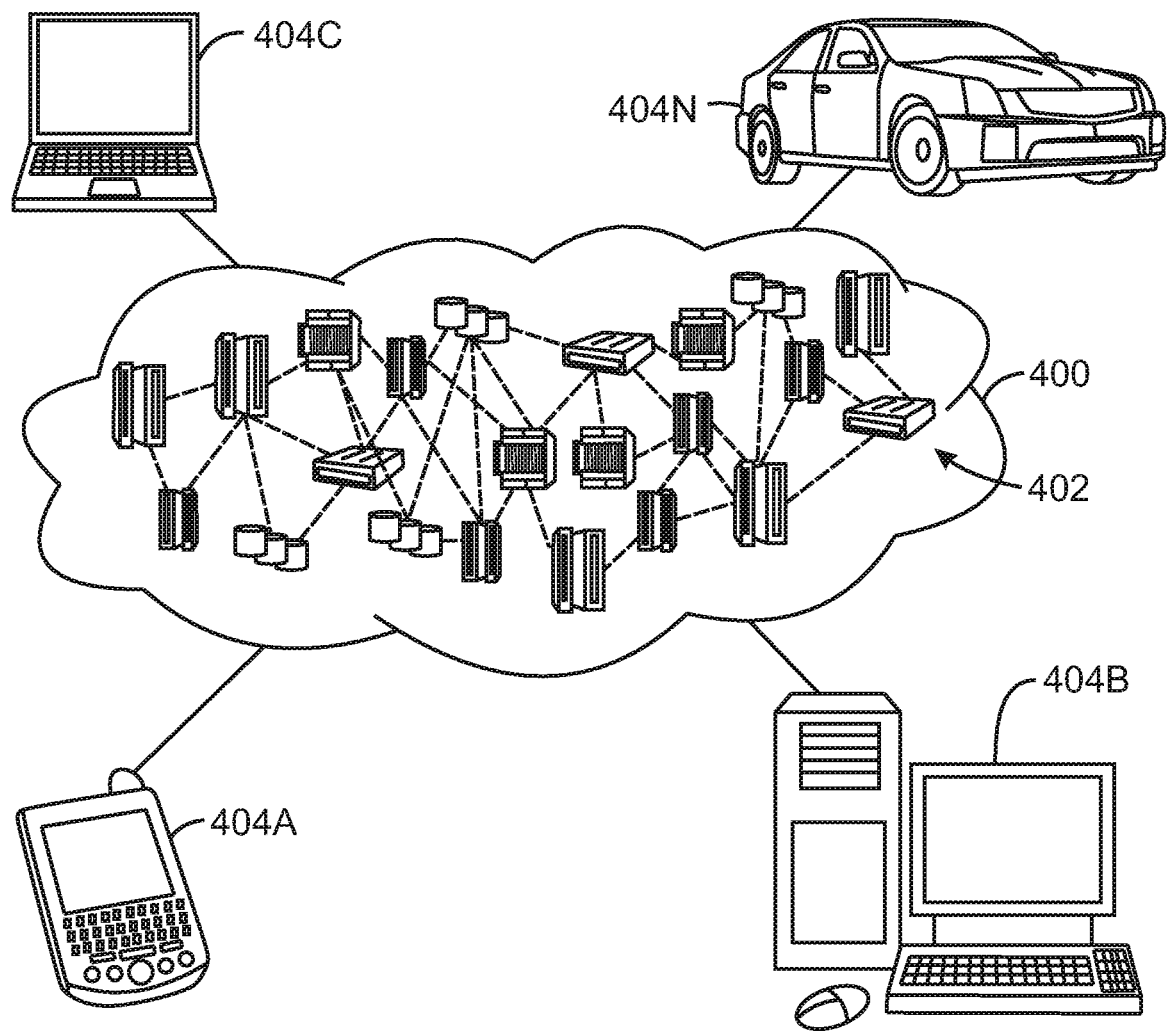
FIG. 4 depicts an illustrative cloud computing environment according to an embodiment described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
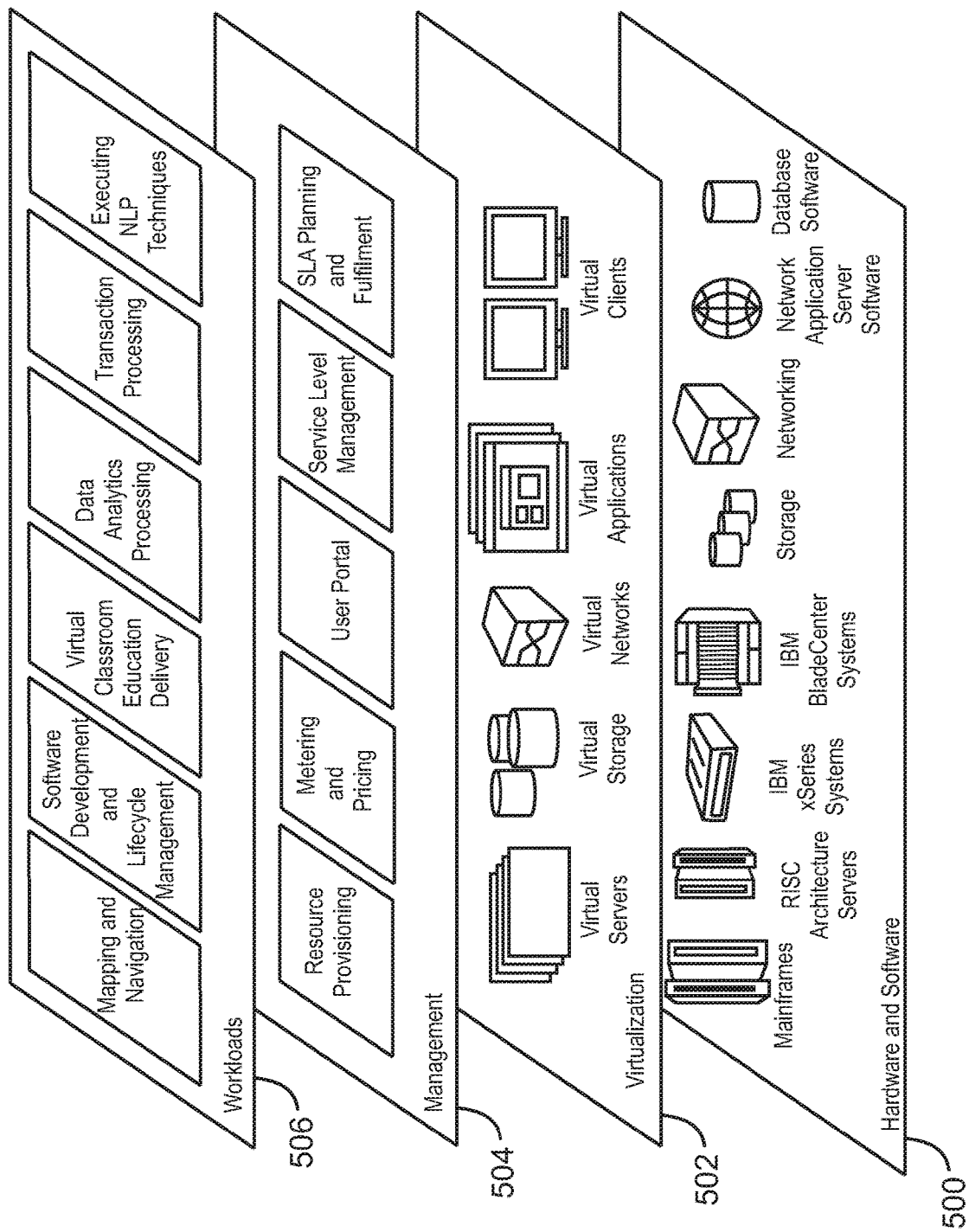
FIG. 5 depicts a set of functional abstraction layers provided by a cloud computing environment according to an embodiment described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and executing natural language processing (NLP) techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a storage device to store a training corpus comprising training data, a parameters vector, and a plurality of edge-related metrics that are related to a plurality of resource constraints associated with an edge device; and
   a processor to:
   train an initial set of Deep Learning (DL) models comprising different topologies using the training data, wherein a topology of each of the initial set of DL models is determined based on the parameters vector;
   wherein, in training of the initial set of DL models, the processor is to generate a set of estimated performance functions for each of the DL models in the initial set for each of the plurality of edge-related metrics, wherein each of the estimated performance functions comprises a set of values that are computed for each of the plurality of edge-related metrics that describe how a performance of each of the DL models changes throughout a range of parameters with respect to each of the plurality of edge-related metrics;
   for each of the plurality of edge-related metrics, generate a plurality of objective functions based on the generated set of estimated performance functions;
   train a plurality of final DL models selected from the initial set of models based on a multi objective optimization of the generated plurality of objective functions, wherein the plurality of final DL models are trained using new model parameters and a new estimated performance function is computed for each of the plurality of edge-related metrics with respect to each of the plurality of final DL models, wherein the new estimated performance functions are used to generate an updated plurality of objective functions and produce a new set of final DL models in response to detecting that a difference between the new estimated performance function of a final DL model from the plurality of final DL models, and the estimated performance functions of a DL model from the initial set of DL models, exceeds a threshold error criterion;
   receive a user selection of a selected DL model from the new set of final DL models; and
   deploy the selected DL model on the edge device.

2. The system of claim 1, wherein the processor is to adjust a topology of one of the models in the final DL model set upon a determination that the performance of the DL model predicted by the objective functions differs from the actual performance of the DL model by the threshold error criterion.

3. The system of claim 1, wherein to receive the user selection comprises to generate a user interface that enables a user to specify an objective and displays a ranked list of top ranked DL models ranked in accordance with the specified objective.

4. The system of claim 3, wherein the processor is to deploy a plurality of DL models to the edge device, and wherein each of the DL models make predictions based on common DL model input, with a final prediction to be determined based on a voting scheme.

5. The system of claim 1, wherein to generate the final DL model set based on the objective functions comprises to compute a Pareto front of a plot of DL model parameters versus DL performance as computed by the objective functions.

6. The system of claim 1, wherein the plurality of edge-related metrics comprise an inference time, a model size, and a test accuracy.

7. The system of claim 1, wherein the parameters vector comprises values describing a number of layers and a number of nodes per layer for each model in the initial set of DL models.

8. The system of claim 1, wherein the selected DL model is a classifier.

9. The system of claim 1, wherein the multi-objective optimization comprises conflicting objectives corresponding to different optimal solutions.

10. A computer-implemented method, the computer-implemented method comprising:
    training an initial set of Deep Learning (DL) models comprising different topologies on training data, wherein a topology of each of the initial set of DL models is determined based on a parameters vector;
    wherein training the initial set of DL models comprises generating a set of estimate performance functions for each of the DL models in the initial set for each of a plurality of edge-related metrics that are related to a plurality of resource constraints associated with an edge device, wherein each of the estimated performance functions comprises a set of values that are computed for each of the plurality of edge-related metrics that describe how a performance of each of the DL models changes throughout a range of parameters with respect to each of the plurality of edge-related metrics;

for each of the plurality of edge-related metrics, generating a plurality of objective functions based on the generated set of estimated performance functions;

training a plurality of final DL models selected from the initial set of models based on a multi objective optimization of the generated plurality of objective functions, wherein the plurality of final DL models are trained using new model parameters and a new estimated performance function is computed for each of the plurality of edge-related metrics with respect to each of the plurality of final DL models, wherein the new estimated performance functions are used to generate an updated plurality of objective functions and produce a new set of final DL models in response to detecting that a difference between the new estimated performance function of a final DL model from the plurality of final DL models, and the estimated performance functions of a DL model from the initial set of DL models, exceeds a threshold error criterion;

receiving a user selection of selected DL model from the new set of final DL models; and deploying the selected DL model on the edge device.

11. The computer-implemented method of claim 10, comprising adjusting a topology of one of the models in the final DL model set upon a determination that the performance of the DL model predicted by the objective functions differs from the actual performance of the DL model by a threshold error criterion.

12. The computer-implemented method of claim 10, wherein receiving the user selection comprises generating a user interface that enables a user to specify an objective and displaying, at the user interface, a ranked list of top ranked DL models ranked in accordance with the specified objective.

13. The computer-implemented method of claim 10, comprising deploying a plurality of DL models to the edge device, and wherein each of the DL models make predictions based on common DL model input, with a final prediction to be determined based on a voting scheme.

14. The computer-implemented method of claim 10, wherein generating the final DL model set based on the objective functions comprises to compute a Pareto front of a plot of DL model parameters versus DL performance as computed by the objective functions.

15. The computer-implemented method of claim 10, wherein the plurality of edge-related metrics comprise an inference time, a model size, and a test accuracy.

16. The computer-implemented method of claim 10, wherein the parameters vector comprises values describing a number of layers and a number of nodes per layer for each model in the initial set of DL models.

17. The computer-implemented method of claim 10, wherein the selected DL model is a classifier.

18. A computer program product for deploying Deep Learning (DL) models on edge devices comprising a computer readable storage medium having program instructions embodied therewith, and wherein the program instructions are executable by a processor to cause the processor to:

train an initial set of DL models comprising different topologies using training data, wherein a topology of each of the initial set of DL models is determined based on a parameters vector that specifies a number of layers and a number of nodes per layer for each model in the initial set of DL models;

wherein, in training of the initial set of DL models, the processor is to generate a set of estimated performance functions for each of the DL models in the initial set for each of a plurality of edge-related metrics comprising an inference time, a model size, and a test accuracy, wherein each of the estimated performance functions comprises a set of values that are computed for each of the plurality of edge-related metrics that describe how a performance of each of the DL models changes throughout a range of parameters with respect to each of the plurality of edge-related metrics;

generate a plurality of objective functions for each of the plurality of edge-related metrics based on the generated set of estimated performance functions;

train a plurality of final DL models selected from the initial set of models based on a multi objective optimization of the generated plurality of objective functions, wherein the plurality of final DL models are trained using new model parameters and a new estimated performance function is computed for each of the plurality of edge-related metrics with respect to each of the plurality of final DL models, wherein the new estimated performance functions are used to generate an updated plurality of objective functions and produce a new set of final DL models in response to detecting that a difference between the new estimated performance function of a final DL model from the plurality of final DL models, and the estimated performance functions of a DL model from the initial set of DL models, exceeds a threshold error criterion;

receive a user selection of a selected DL model from the new set of final DL models; and deploy the selected DL model on the edge device.

19. The computer program product of claim 18, wherein to receive the user selection comprises to generate a user interface that enables a user to specify an objective and displays a ranked list of top ranked DL models ranked in accordance with the specified objective.

* * * * *